(12) United States Patent
Abe

(10) Patent No.: US 6,735,385 B2
(45) Date of Patent: May 11, 2004

(54) VIEWING APPARATUS HAVING A PHOTOGRAPHING SYSTEM

(75) Inventor: Tetsuya Abe, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/255,588

(22) Filed: Sep. 27, 2002

(65) Prior Publication Data

US 2003/0072567 A1 Apr. 17, 2003

(30) Foreign Application Priority Data

Sep. 28, 2001 (JP) ........................................ 2001-301870

(51) Int. Cl.⁷ .......................... G03B 13/00; G02B 23/00
(52) U.S. Cl. ........................ 396/144; 396/432; 359/412
(58) Field of Search ................................ 396/144, 432; 359/399, 407, 412

(56) References Cited

U.S. PATENT DOCUMENTS

| | | | |
|---|---|---|---|
| 4,067,027 A | 1/1978 | Yamazaki | |
| 4,262,988 A | 4/1981 | Ishibai et al. | |
| 4,400,065 A | 8/1983 | Nagler | |
| 5,583,692 A | 12/1996 | Funatsu | |
| 5,729,390 A | 3/1998 | Abe | |
| 5,926,657 A | 7/1999 | Hasushita | |
| 6,088,053 A | 7/2000 | Hammack et al. | |
| 6,476,963 B1 * | 11/2002 | Chen | 359/412 |
| 2001/0028498 A1 | 10/2001 | Haga et al. | |

FOREIGN PATENT DOCUMENTS

| | | |
|---|---|---|
| JP | 57-79909 | 5/1982 |
| JP | 62-96919 | 5/1987 |
| JP | 5-2132 | 1/1993 |
| JP | 6-2330 | 1/1994 |
| JP | 7-8848 | 2/1995 |
| JP | 7-283978 | 10/1995 |
| JP | 2624556 | 4/1997 |
| JP | 11248996 | 9/1999 |
| JP | 1-281555 | 10/2001 |
| JP | 1-311868 | 11/2001 |
| WO | 01/52531 | 7/2001 |

OTHER PUBLICATIONS

English Language Abstract of JP 11–248996.
English Language Abstract of JP 2001–311868.

* cited by examiner

Primary Examiner—Russell Adams
Assistant Examiner—Arthur Smith
(74) Attorney, Agent, or Firm—Greenblum & Bernstein, P.L.C.

(57) ABSTRACT

A viewing apparatus having a photographing function includes a viewing system including a viewing optical system, the viewing optical system having a positive objective optical system and an eyepiece optical system, an image of an object formed through the positive objective optical system being viewed through the eyepiece optical system; and a photographing system including a photographing optical system for photographing the object image viewed through the eyepiece optical system, the photographing optical system being provided independently of the viewing optical system. The photographing optical system includes a first lens group and a second lens group. The photographing system includes two focusing mechanisms, which operate independently from each other, for changing both absolute positions of the first lens group and the second lens group and a relative position of the first lens group and the second lens group on an optical axis of the photographing optical system.

32 Claims, 6 Drawing Sheets

Fig. 5
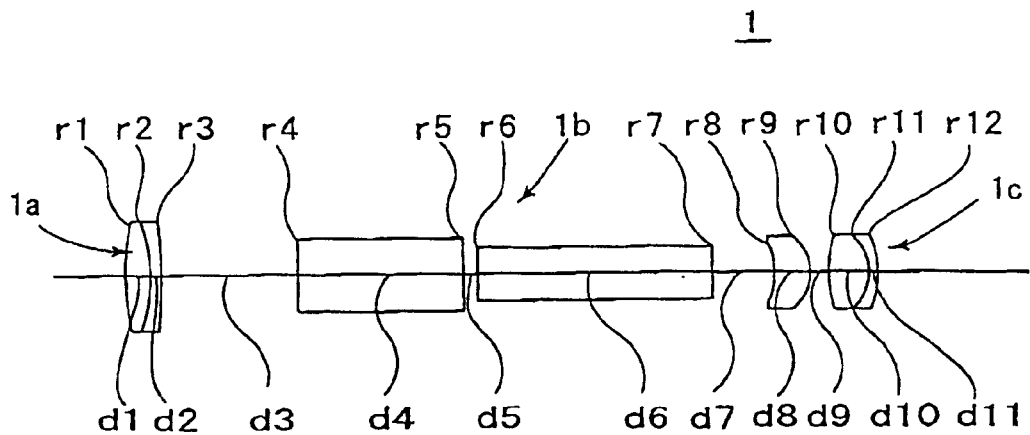
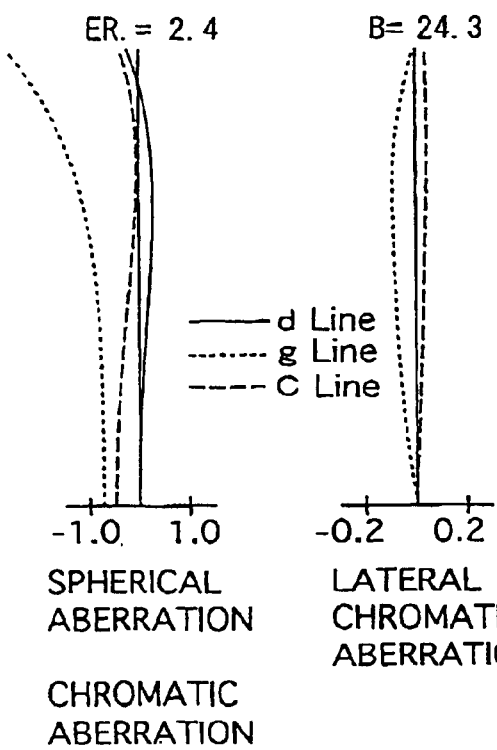
Fig. 6A          Fig. 6B          Fig. 6C          Fig. 6D
SPHERICAL
ABERRATION
CHROMATIC
ABERRATION
LATERAL
CHROMATIC
ABERRATION
ASTIGMATISM
DISTORTION Fig. 7
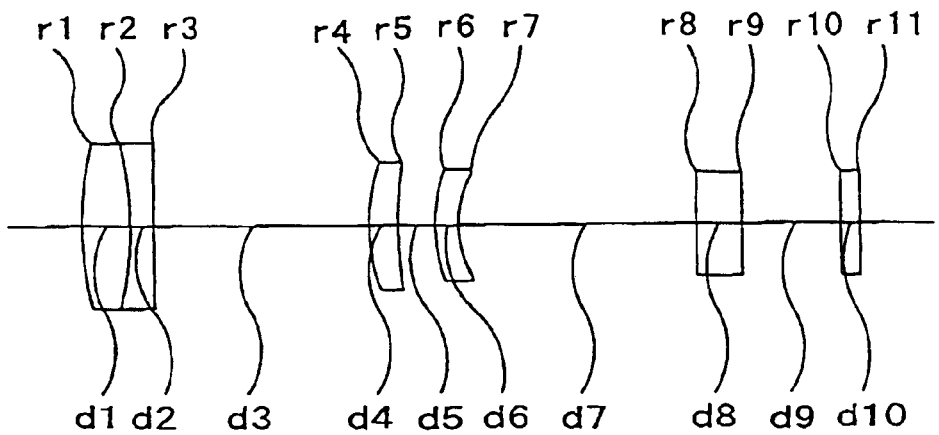
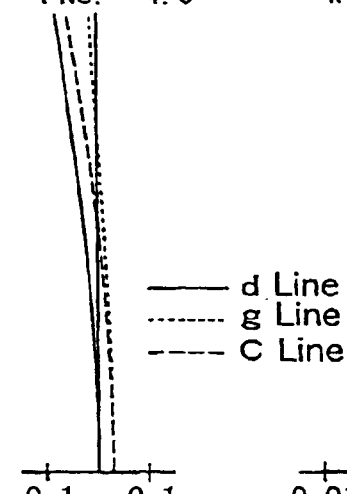
Fig. 8A
FNo.= 4.0
—— d Line
······ g Line
---- C Line
-0.1  0.1
SPHERICAL
ABERRATION
CHROMATIC
ABERRATION
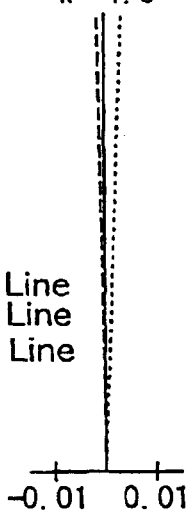
Fig. 8B
W= 4.6
-0.01  0.01
LATERAL
CHROMATIC
ABERRATION
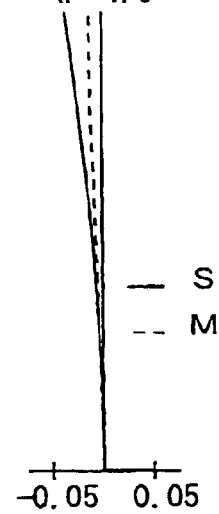
Fig. 8C
W= 4.6
—— S
-- M
-0.05  0.05
ASTIGMATISM
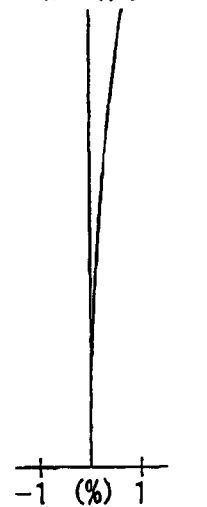
Fig. 8D
W= 4.6
-1 (%) 1
DISTORTION

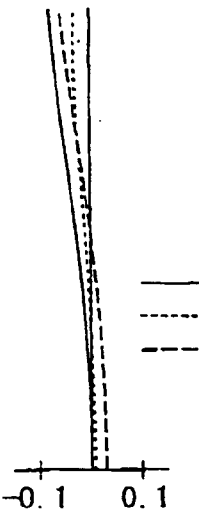

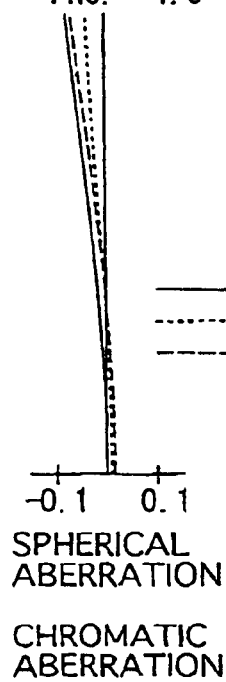
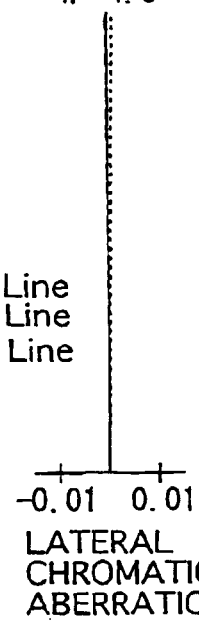
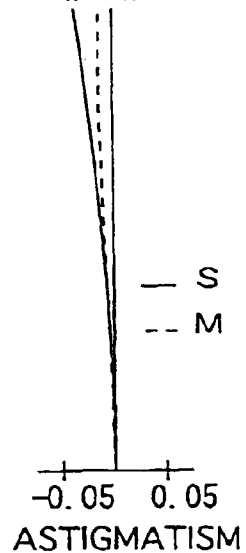
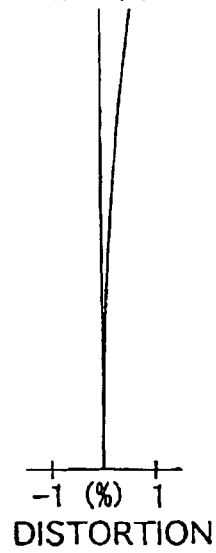
Fig. 11A  Fig. 11B  Fig. 11C  Fig. 11D
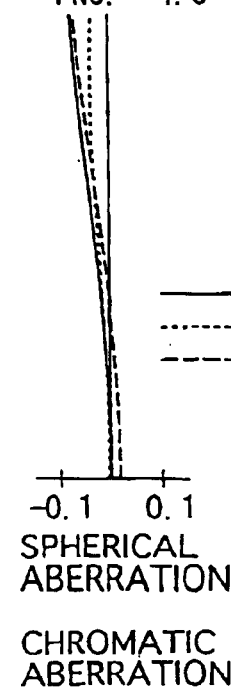
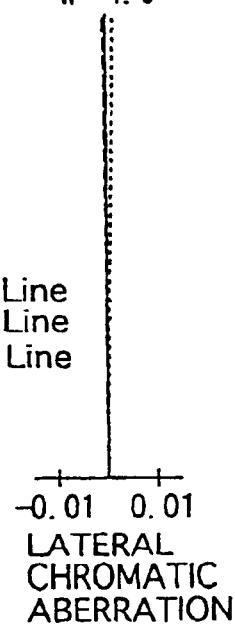
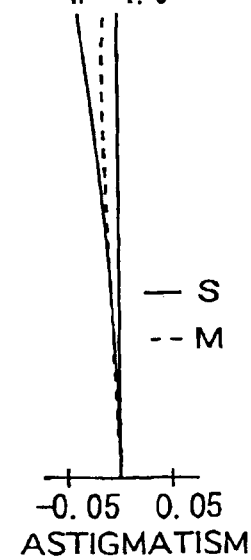
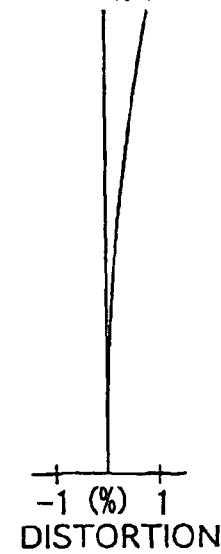
Fig. 12A  Fig. 12B  Fig. 12C  Fig. 12D

VIEWING APPARATUS HAVING A PHOTOGRAPHING SYSTEM

BACKGROUND OF THE INVENTION

1. Field of the Invention

The present invention relates to a viewing apparatus which includes a viewing optical system (e.g., a viewing optical system of a telescope or a binocular) and a photographing optical system for photographing an object viewed through the viewing optical system, wherein a distant object can be viewed through the viewing optical system, and recorded as image data at the same time.

2. Description of the Prior Art

Telescopes and binoculars are known as viewing apparatuses for viewing distant objects. However, such conventional viewing apparatuses do not have a function of recording object images which are viewed therethrough. Although there have been various proposals of combining a viewing apparatus such as a telescope or a binocular with a camera to achieve such an image recording function, none of these proposals are practical for ordinary users due to, for example, an unavoidable increase in size of the viewing apparatus.

The ideal magnification of a binocular for general use is approximately seven times (×7). This degree of magnification is advantageous for viewing a distant object closely with a decreased influence in hand shake. Nevertheless, the field of view of a binocular corresponds to that viewed through a long-focus telephoto lens system of over 300 mm attached to a 35 mm camera. Accordingly, if the function of recording an image viewed through a binocular is achieved simply by combining a typical binocular with a conventional camera, the system becomes bulky.

In addition, the photographing lens system of such a multi-function viewing apparatus is required to have a high optical performance if high-resolution object images are to be recorded. This inevitably increases the number of lens elements to thereby increase the cost of production and the weight of the entire optical system.

In such a multi-function viewing apparatus, to maintain adequate operability as a viewing apparatus, it is desirable for the focusing mechanism of the photographing optical system to operate in association with the focusing operation of the binocular. However, in a long-focus telephoto lens system such as the aforementioned long-focus telephoto lens system having a focal length of over 300 mm, it is impossible to achieve a focusing operation with a sufficient degree of accuracy simply by the focusing mechanism of the photographing optical system operating in association with the focusing operation of the binocular since such a long-focus telephoto lens system is required to be focused on viewing objects with a high degree of accuracy.

In a focusing operation of a viewing apparatus, it is normally the case that a user visually finds a sharp focal point on an object image while manually operating the apparatus. However, vision varies greatly between individuals, and accordingly, the focal point varies greatly between individuals.

SUMMARY OF THE INVENTION

The present invention provides a viewing optical system having both a distant-object viewing function and a distant-object image recording function with a low cost of production without increasing the size of the optical system, and further provides such a viewing optical system which achieves easy operability in a focusing operation.

As an aspect of the invention, a viewing apparatus having a photographing function is provided, including a viewing system having a viewing optical system, the viewing optical system having a positive objective optical system and an eyepiece optical system, an image of an object formed through the positive objective optical system being viewed through the eyepiece optical system; and a photographing system including a photographing optical system for photographing the object viewed through the eyepiece optical system, the photographing optical system being provided independently of the viewing optical system. The photographing optical system includes a first lens group and a second lens group. The photographing system includes two focusing mechanisms, which operate independently from each other, for changing both absolute positions of the first lens group and the second lens group and a relative position of the first lens group and the second lens group on an optical axis of the photographing optical system.

It is desirable for the first lens group and the second lens group to be arranged in that order from an object, the two focusing mechanisms moving the first lens group and the second lens group along the optical axis independent of each other to shift an image of the object to a predetermined point.

It is also desirable for the following conditions (1) and (2) to be satisfied:

$$0.1 < f_t/f_0 < 0.7 \quad \ldots (1)$$

$$0.4 < |T_I/T_{II}| < 2.5 \quad \ldots (2)$$

wherein

"$f_t$" represents the focal length of the photographing optical system,

"$f_0$" represents the focal length of the positive objective optical system of the viewing optical system, "$T_I$" represents the traveling distance of the first lens group necessary for achieving focus from an infinite distance to a finite object distance, and "$T_{II}$" represents the traveling distance of the second lens group necessary for achieving focus from an infinite distance to the finite object distance.

It is desirable for the eyepiece optical system to have a positive power, wherein the following condition (3) is satisfied:

$$5 < f_0/f_e \quad \ldots (3)$$

wherein

"$f_0$" represents the focal length of the objective optical system of the viewing optical system, and "$f_e$" represents the focal length of the eyepiece optical system of the viewing optical system.

The reason why the viewing optical system can be prevented from increasing in size while satisfying conditions (1) through (3) (even though the focal length of the photographing optical system in particular is shortened) is that digital cameras using an image pick-up device (e.g., CCD) instead of conventional cameras using a silver-halide film have become popularized in recent years. The scale of integration of the CDD has increased rapidly; the size of the image plane (picture plane) of a typical CCD is approximately one tenth of the size of a conventional 35 mm film frame. Moreover, even if the focusing mechanism of the photographing optical system operates in association with the focusing mechanism of the viewing optical system, a sufficiently high focusing sensitivity can be obtained by making the focal length of the photographing lens system shorter than the focal length of the objective optical system of the viewing optical system. Furthermore, providing the viewing optical system with a focus system for independently moving the first and second lens groups along the optical axis to shift an image focal point of an image of a viewing object to a given point makes it possible to correct deviation of the focal point set by a manual operation of the user with an auxiliary device such as an autofocus system.

The viewing system can include a first focusing mechanism for moving at least one optical element of the viewing optical system along the optical axis to shift an object image formed by the photographing optical system to a given point to focus the viewing system on the object, a second focusing mechanism for moving one of the first lens group and the second lens group to shift an image formed by the photographing optical system, and an association mechanism which interconnects the first focusing mechanism with the second focusing mechanism to allow the first focusing mechanism to operate in association with the second focusing mechanism.

The viewing system can include a telescope, wherein the eyepiece optical system has positive power, and wherein an image formed through the positive objective optical system is viewed through the positive eyepiece optical system.

As another aspect of the invention, a viewing apparatus having a photographing function is provided, including a viewing system having a pair of viewing optical systems, each of the pair of viewing optical systems having a positive objective optical system and an eyepiece optical system, an image of an object formed through the positive objective optical system being viewed through the eyepiece optical system; and a photographing system including a photographing optical system for photographing the object image viewed through the eyepiece optical system, the photographing optical system being provided independent of the pair of viewing optical systems. The photographing optical system includes a first lens group and a second lens group. The photographing system includes two focusing mechanisms, which operate independently from each other, for changing both absolute positions of the first lens group and the second lens group and a relative position of the first lens group and the second lens group on an optical axis of the photographing optical system.

It is desirable for the optical axis of the photographing optical system to be provided between two optical axes of the pair of viewing optical systems Furthermore, the photographing system can include an image pick-up device, an object image being focused on the image pick-up device through the photographing optical system to be recorded as image data.

A Petzval lens system is known as an optical system used as a telephoto lens system. A Petzval lens system includes a positive first lens group and a positive second lens group, wherein each of the first and second lens groups is constituted by a positive lens element and a negative lens element. The Petzval lens system is often used as a telephoto lens system since a preferable optical performance is obtained with a relatively less number of optical elements.

Accordingly, it is desirable that the Petzval lens system serve as the photographing optical system. Namely, it is desirable for the photographing optical system to include a positive first lens group having a positive lens element and a negative lens element, and a positive second lens group having a positive lens element and a negative lens element, and wherein the following condition (4) is satisfied:

$$0.15 < D_{I-II}/f < 0.7 \quad \ldots (4)$$

wherein

"$D_{I-II}$" represents the space between the first lens group and the second lens groups when an object at infinity is in an in-focus state, and "f" represents the focal length of the photographing optical system.

It is desirable for the following conditions (5) and (6) to be satisfied:

$$1 < AC_I/AC_{II} \quad \ldots (5)$$

$$20 < v_{Ip}/v_{In} \quad \ldots (6)$$

wherein

"$AC_I$" represents the sum of the absolute values of the reciprocals of the products of the focal length of each lens element and Abbe numbers thereof ($|1/(fi*vi)|$) in the first lens group, "$AC_{II}$" represents the sum of the absolute values of the reciprocals of the products of the focal length of each lens element and Abbe numbers thereof ($|1/(fi*vi)|$) in the second lens group, "$v_{Ip}$" represents Abbe number of the positive lens element of the first lens group, and "$v_{In}$" represents Abbe number of the negative lens element of the first lens group.

The positive lens element of the first lens group and the negative lens element of the first lens group can be cemented to each other.

It is desirable for the first lens group and the second lens group to be arranged in that order from an object; wherein one of the two focusing mechanisms moves the photographing optical system along the optical axis, wherein the other of the two focusing mechanisms moves the first lens group independently, and the following conditions (7) and (8) are satisfied:

$$0.1 < f_t/f_0 < 0.7 \quad \ldots (7)$$

$$0.2 < |T_A/T_I| < 1.5 \quad \ldots (8)$$

wherein

"$f_t$" represents the focal length of the photographing optical system,

"$f_0$" represents the focal length of the objective optical system of the viewing optical system, "$T_A$" represents the traveling distance of the photographing optical system necessary for achieving focus from an infinite distance to a finite object distance, and "$T_I$" represents the traveling distance of the first lens group necessary for achieving focus from an infinite distance to the finite object distance.

It is desirable for the eyepiece optical system to have a positive power, and wherein the following condition (9) is satisfied:

$$5 < f_0/f_e \quad \ldots (9)$$

wherein

"$f_0$" represents the focal length of the objective optical system of the viewing optical system, and "$f_e$" represents the focal length of the eyepiece optical system of the viewing optical system.

The viewing apparatus can include a first focusing mechanism for moving at least one optical element of the viewing optical system along the optical axis in accordance with a variation of an object distance to shift an image of the object image to a predetermined point to focus the viewing system on the object, a second focusing mechanism for moving one of the photographing optical system and the first lens group, and an association mechanism which interconnects the first focusing mechanism with the second focusing mechanism to allow the first focusing mechanism to operate in association with the second focusing mechanism.

The viewing system can include as a telescope, wherein the eyepiece optical system has a positive power, and wherein an image formed through the positive objective optical system is viewed through the positive eyepiece optical system.

As another aspect of the invention, a viewing apparatus having a photographing function is provided, including a viewing system having a pair of viewing optical systems, each of the pair of viewing optical systems having a positive objective optical system and an eyepiece optical system, an image of an object formed through the positive objective optical system being viewed through the eyepiece optical system, and a photographing system including a photographing optical system for photographing the object viewed through the eyepiece optical system, the photographing optical system being provided independently from the pair of viewing optical systems. The photographing optical system includes a first lens group and a second lens group, in that order from an object. The photographing system includes two focusing mechanisms which operate independently from each other. One of the two focusing mechanisms moves the photographing optical system along the optical axis, and the other of the two focusing mechanisms moves the first lens group along the optical axis independently. Furthermore, the following conditions (7) and (8) are satisfied:

$$0.1 < f_t/f_0 < 0.7 \quad \ldots (7)$$

$$0.2 < |T_A/T_I| < 1.5 \quad \ldots (8)$$

wherein
- "$f_t$" represents the focal length of the photographing optical system,
- "$f_0$" represents the focal length of the objective optical system of the viewing optical system,
- "$T_A$" represents the traveling distance of the photographing optical system necessary for achieving focus from an infinite distance to a finite object distance, and
- "$T_I$" represents the traveling distance of the first lens group necessary for achieving focus from an infinite distance to the finite object distance.

It is desirable for the optical axis of the photographing optical system to be provided between two optical axes of the pair of viewing optical systems.

Furthermore, the photographing system can include an image pick-up device, an object image being focused on the image pick-up device through the photographing optical system to be recorded as image data.

The photographing optical system can include a positive first lens group having a positive lens element and a negative lens element, and a positive second lens group having a positive lens element and a negative lens element, and wherein the following condition (10) is satisfied:

$$0.15 < D_{I-II}/f < 0.7 \quad \ldots (10)$$

wherein
- "$D_{I-II}$" represents the space between the first lens group and the second lens groups when an object at infinity is in an in-focus state, and
- "f" represents the focal length of the photographing optical system.

It is desirable for the following conditions (11) and (12) to be satisfied:

$$1 < AC_I/AC_{II} \quad \ldots (11)$$

$$20 < v_{Ip}/v_{In} \quad \ldots (12)$$

wherein
- "$AC_I$" represents the sum of the absolute values of the reciprocals of the products of the focal length of each lens element and Abbe numbers thereof ($|1/(fi*vi)|$) in the first lens group,
- "$AC_{II}$" represents the sum of the absolute values of the reciprocals of the products of the focal length of each lens element and Abbe numbers thereof ($|1/(fi*vi)|$) in the second lens group,
- "$v_{Ip}$" represents Abbe number of the positive lens element of the first lens group, and
- "$v_{In}$" represents Abbe number of the negative lens element of the first lens group.

The positive lens element of the first lens group and the negative lens element of the first lens group can be cemented to each other.

It is desirable for the first lens group and the second lens group to be arranged in that order from an object, wherein one of the two focusing mechanisms moves the photographing optical system along the optical axis, and the other of the two focusing mechanisms moves the second lens group along the optical axis independently. The following conditions (13) and (14) are satisfied:

$$0.1 < f_t/f_0 < 0.7 \quad \ldots (13)$$

$$0.2 < |T_A/T_{II}| < 1.5 \quad \ldots (14)$$

wherein
- "$f_t$" represents the focal length of the photographing optical system,
- "$f_0$" represents the focal length of the objective optical system of the viewing optical system,
- "$T_A$" represents the traveling distance of the photographing optical system necessary for achieving focus from an infinite distance to a finite object distance, and
- "$T_{II}$" represents the traveling distance of the second lens group necessary for achieving focus from an infinite distance to the finite object distance.

The eyepiece optical system can have a positive power, wherein the following condition (15) is satisfied:

$$5 < f_0/f_e \quad \ldots (15)$$

wherein
- "$f_0$" represents the focal length of the objective optical system of the viewing optical system, and
- "$f_e$" represents the focal length of the eyepiece optical system of the viewing optical system.

The viewing apparatus can include a first focusing mechanism for moving at least one optical element of the viewing optical system along the optical axis in accordance with a variation of an object distance to shift an image of the object to a given point; a second focusing mechanism for moving one of the photographing optical system and the second lens group; and an association mechanism which interconnects the first focusing mechanism with the second focusing mechanism to allow the first focusing mechanism to operate in association with the second focusing mechanism.

The viewing system can serve as a telescope, wherein the eyepiece optical system has a positive power, and wherein an image formed through the positive objective optical system is viewed through the positive eyepiece optical system.

As a further aspect of the invention, a viewing apparatus having a photographing function is provided, including a viewing system having a pair of viewing optical systems, each of the pair of viewing optical systems having a positive objective optical system and an eyepiece optical system, an image of an object formed through the positive objective optical system being viewed through the eyepiece optical system, and a photographing system including a photographing optical system for photographing the object image viewed through the eyepiece optical system, the photographing optical system being provided independently from the pair of viewing optical systems. The photographing optical system includes a first lens group and a second lens group in that order from the object. The photographing system includes two focusing mechanisms which operate independently from each other. One of the two focusing mechanisms moves the photographing optical system along the optical axis, and the other of the two focusing mechanisms moves the second lens group along the optical axis independently. The following conditions (13) and (14) are satisfied:

$$0.1 < f_t/f_0 < 0.7 \quad \ldots (13)$$

$$0.2 < |T_A/T_{II}| < 1.5 \quad \ldots (14)$$

wherein
"$f_t$" represents the focal length of the photographing optical system,
"$f_0$" represents the focal length of the objective optical system of the viewing optical system,
"$T_A$" represents the traveling distance of the photographing optical system necessary for achieving focus from an infinite distance to a finite object distance, and
"$T_{II}$" represents the traveling distance of the second lens group necessary for achieving focus from an infinite distance to the finite object distance.

It is desirable for the optical axis of the photographing optical system to be provided between two optical axes of the pair of viewing optical systems.

Furthermore, the photographing system can include an image pick-up device, an object image being focused on the image pick-up device through the photographing optical system to be recorded as image data.

The photographing optical system can include a positive first lens group including a positive lens element and a negative lens element, and a positive second lens group including a positive lens element and a negative lens element, and wherein the following condition (16) is satisfied:

$$0.15 < D_{I-II}/f < 0.7 \quad \ldots (16)$$

wherein
"$D_{I-II}$" represents the space between the first lens group and the second lens groups when an object at infinity is in an in-focus state, and
"f" represents the focal length of the photographing optical system.

It is desirable for the following conditions (17) and (18) to be satisfied:

$$1 < AC_I/AC_{II} \quad \ldots (17)$$

$$20 < v_{Ip}/v_{In} \quad \ldots (18)$$

wherein
"$AC_I$" represents the sum of the absolute values of the reciprocals of the products of the focal length of each lens element and Abbe numbers thereof ($|1/(fi*vi)|$) in the first lens group,
"$AC_{II}$" represents the sum of the absolute values of the reciprocals of the products of the focal length of each lens element and Abbe numbers thereof ($|1/(fi*vi)|$) in the second lens group,
"$v_{Ip}$" represents Abbe number of the positive lens element of the first lens group, and
"$v_{In}$" represents Abbe number of the negative lens element of the first lens group.

The positive lens element of the first lens group and the negative lens element of the first lens group can be cemented to each other.

As a further aspect of the invention, a viewing apparatus is provided, including a binocular optical system including a pair of viewing optical systems, each of the pair of viewing optical systems having a positive objective optical system and an eyepiece optical system, an image of an object formed through the positive objective optical system being viewed through the eyepiece optical system, and a photographing system including a photographing optical system for photographing the object viewed through the eyepiece optical system, the photographing optical system being provided independently from the pair of viewing optical systems. The photographing optical system includes a first movable lens group and a second movable lens group. The photographing system can include two focusing mechanisms, which operate independently from each other, for changing both absolute positions of the first lens group and the second lens group and a relative position of the first lens group and the second lens group on an optical axis of the photographing optical system. One of the two focusing mechanisms is interconnected with, and operates in association with, a manual focusing mechanism of the binocular optical system, and the other of the two focusing mechanisms includes an autofocus system.

The present disclosure relates to subject matter contained in Japanese Patent Application No. 2001-301870 (filed on Sep. 28, 2001) which is expressly incorporated herein in its entirety.

BRIEF DESCRIPTION OF THE DRAWINGS

The present invention will be discussed below in detail with reference to the accompanying drawings, in which:

FIG. 5 shows a lens diagram of an embodiment of a viewing optical system of the viewing apparatus shown in FIG. 1;

FIGS. 6A through 6D show various aberrations which occur in the embodiment of the viewing optical system shown in FIG. 5;

FIG. 7 shows a lens diagram of fundamental optical elements (a first lens group, a second lens group, a filter and a glass cover) of any one of the photographing lens barrels shown in FIGS. 2, 3 and 4;

FIGS. 8A through 8D show various aberrations, which occur in a first embodiment of the fundamental optical elements shown in FIG. 7 and are formed according to the numerical data shown in Table 2, when an object at an infinite distance is in an in-focus state;

FIGS. 9A through 9D show various aberrations, which occur in a second embodiment of the fundamental optical elements shown in FIG. 7 and are formed according to the numerical data shown in Table 3, when an object at an infinite distance is in an in-focus state;

FIGS. 10A through 10D show various aberrations, which occur in a third embodiment of the fundamental optical elements shown in FIG. 7 and are formed according to the numerical data shown in Table 4, when an object at an infinite distance is in an in-focus state;

FIGS. 11A through 11D show various aberrations, which occur in a fourth embodiment of the fundamental optical elements shown in FIG. 7 and are formed according to the numerical data shown in Table 5, when an object at an infinite distance is in an in-focus state; and FIGS. 12A through 12D show various aberrations, which occur in a fifth embodiment the fundamental optical elements shown in FIG. 7 and are formed according to the numerical data shown in Table 6, when an object at an infinite distance is in an in-focus state.

DESCRIPTION OF THE PREFERRED EMBODIMENTS

Figure 1:
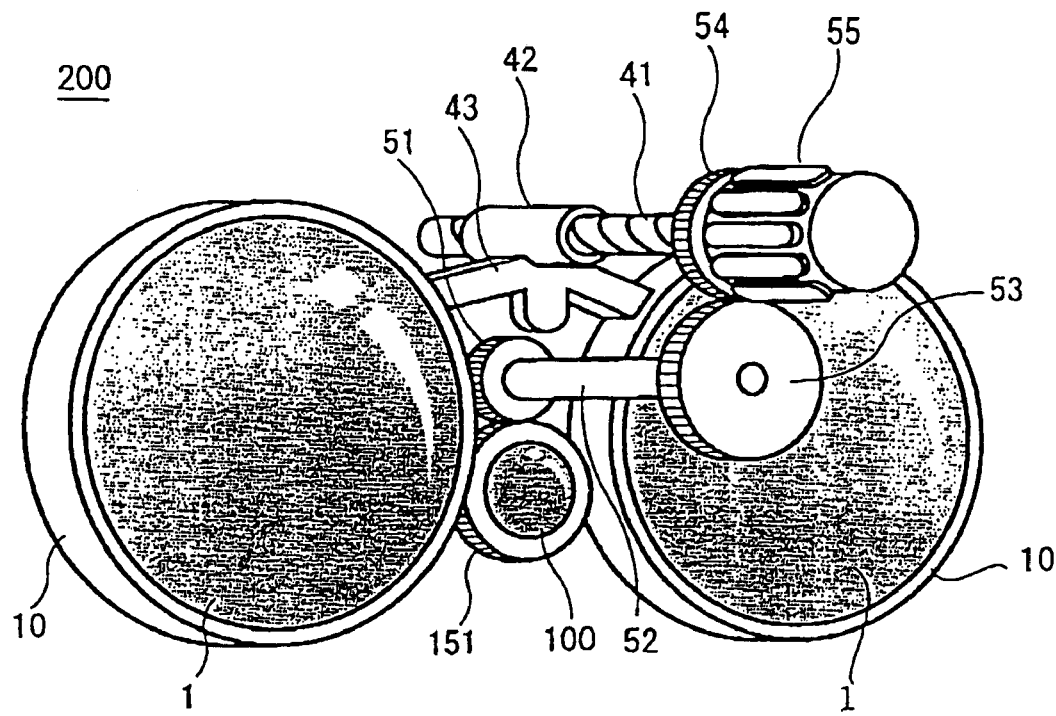
FIG. 1 is a schematic perspective view of fundamental elements of an embodiment of a viewing apparatus having a photographing system according to the present invention.

FIG. 1 shows fundamental elements of an embodiment of a viewing apparatus having a photographing system according to the present invention. The viewing apparatus 200 is constructed as a combination of a binocular having a binocular optical system with a photographing system having a photographing optical system 100.

The binocular optical system of the viewing apparatus 200 includes a pair of viewing optical systems (a pair of refracting telescope optical systems) 1. As known in the art, each viewing optical system 1 includes a positive objective optical system 1a (refer to FIG. 5) having a plurality of lens elements for forming an inverted object image which is upside down and reversed from left to right, an erecting optical system 1b (e.g., a Porro prism erecting system) for erecting the inverted object image formed by the objective optical system to a proper orientation, and a positive eyepiece optical system 1c for viewing the erected object image reinverted by the erecting optical system, in that order from the object (see FIG. 5). In FIG. 1, only a portion of the objective optical system of each viewing optical system 1 is shown as the viewing optical system 1 for the purpose of simplicity.

The photographing optical system 100 has a positive power, and is constructed from a plurality of lens elements. As shown in FIG. 1, the photographing optical system 100 is positioned between the pair of viewing optical systems 1. In FIG. 1, only a portion of the photographing optical system 100 is shown as the photographing optical system 100 for the purpose of simplicity.

In each viewing optical system 1, a portion of the objective optical system is fixed to an objective lens frame 10. The two objective lens frames 10 are coupled to each other via an arm 43. A hollow cylindrical member 42 is fixed to top center of the arm 43. The cylindrical member 42 is provided on an inner peripheral surface thereof with a female threaded portion (not shown). A screw shaft 41 is inserted in the cylindrical member 42 so that a male threaded portion of the screw shaft 41 is engaged with the female threaded portion of the cylindrical member 42. As shown in FIG. 1, a spur gear 54 is coaxially fixed to the rear end of the screw shaft 41, while a manual focus knob 55 is coaxially fixed to the rear face of the spur gear 54.

Rotation of the manual focus knob 55 causes the screw shaft 41 to rotate to thereby move the cylindrical member 42 along the forward/backward direction of the viewing apparatus 200. When the cylindrical member 42 moves forward/backward in this manner, the arm 43 and the two objective lens frames 10 that are fixed to the arm 43 concurrently move along the forward/backward direction of the viewing apparatus 200. Therefore, a portion (e.g., a focusing lens group) of the objective optical system of each viewing optical system 1 moves along the optical axis thereof by rotation of the manual focus knob 55. Accordingly, the pair of viewing optical systems 1 that serve as a binocular optical system are focused on an object by manually turning the manual focus knob 55.

The photographing system of the viewing apparatus 200 includes the photographing optical system 100, at least one rotatable lens barrel which accommodates the photographing optical system 100, and a helicoidal thread structure (i.e., a lens barrel drive structure using helicoidal threads) for driving the rotatable lens barrel(s). The rotatable lens barrel(s) is rotated to move the photographing optical system 100 along an optical axis O thereof to bring an object into focus via the helicoidal thread structure.

The photographing optical system 100 includes a positive first lens group 101 and a positive second lens group 102 in that order from the object. The first lens group 101 is fixed to a first lens group support frame 120. The first lens group support frame 120 is provided on an outer peripheral surface thereof with a spur gear portion 151 provided about the optical axis O. The viewing apparatus 200 is provided below the screw shaft 41 with a drive shaft 52 which extends parallel to the screw shaft 41 in the forward/backward direction of the viewing apparatus 200. A front spur gear 51 which meshes with the spur gear portion 151 of the first lens group support frame 120 and a rear spur gear 53 which meshes with the spur gear 54 of the screw shaft 41 are coaxially fixed to the front and rear ends of the drive shaft 52, respectively.

Due to such a gear mechanism (association mechanism), rotation of the manual focus knob 55 causes the first lens group support frame 120 to rotate via the spur gear 54, the rear spur gear 53, the front spur gear 51 and the spur gear portion 151. Accordingly, the photographing system of the viewing apparatus 200 is focused on an object by manually turning the manual focus knob 55 via the aforementioned helicoidal thread structure of the photographing system. Consequently, according to the gear mechanism shown in FIG. 1, the focusing operation of the pair of viewing optical systems 1 and the focusing operation of the photographing optical system 100 are interconnected to be performed concurrently.

A feature of the present invention is that it is possible to change both the absolute positions of the first and second lens groups 101 and 102 on the optical axis O and the relative position of the first and second lens groups 101 and 102 to sharply focus the photographing system of the viewing apparatus 200 on an object in association with a focusing mechanism of the binocular optical system with two independent focusing mechanisms (first and second focusing mechanisms) incorporated in the photographing system of the viewing apparatus 200. The first focusing mechanism of the photographing system is interconnected with, and operates in association with, the focusing mechanism of the binocular optical system via an association mechanism, and the second focusing mechanism of the photographing system incorporates an AF (autofocus) system. The spur gear 54, the front spur gear 51, the drive shaft 52, the front spur gear 51, and the spur gear portion 151 constitute the association mechanism.

Figure 2:
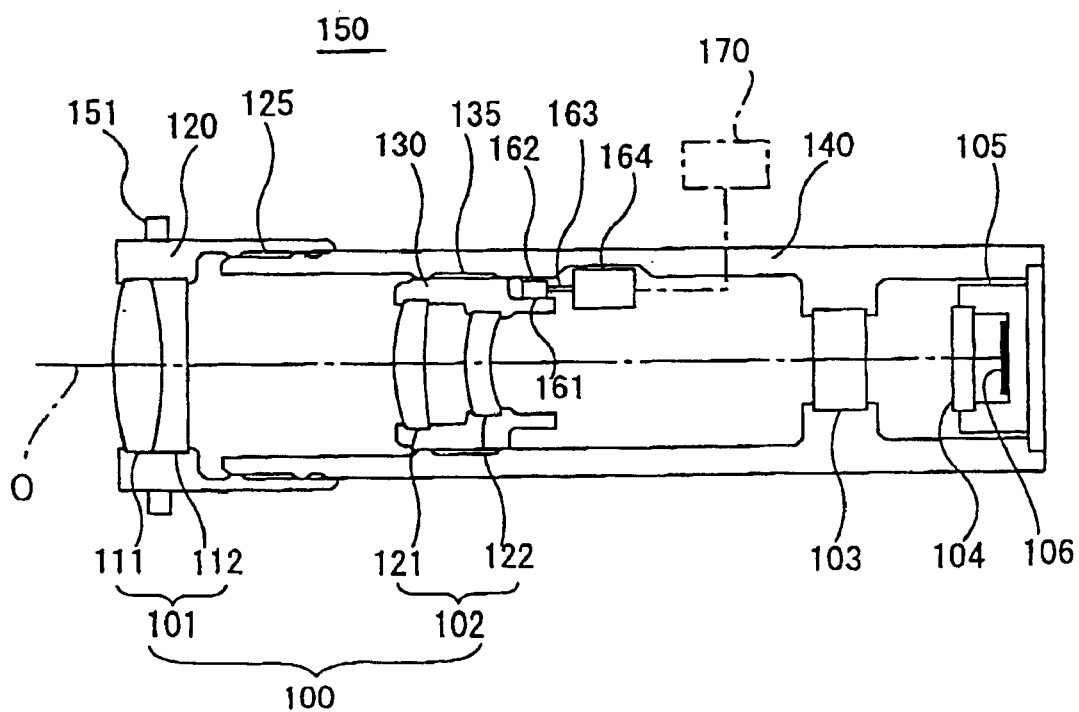
FIG. 2 is an axial cross sectional view of a first embodiment of a photographing lens barrel of the viewing apparatus shown in FIG. 1.

FIG. 2 shows the first embodiment of a photographing lens barrel 150 of the viewing apparatus 200 shown in FIG. 1. In the photographing lens barrel 150 shown in FIG. 2, the first lens group 101 of the photographing optical system 100 includes a first lens element 111 having positive power and a second lens element 112 having negative power. The first and second lens elements 111 and 112 are cemented to each other to serve as a single cemented lens. In addition, the second lens group 102, which is positioned behind the first lens group 101, includes a third lens element 121 having positive power and a fourth lens element 122 having negative power. As shown in FIG. 2, the first lens element 111, the second lens element 112, the third lens element 121 and the fourth lens element 122 are arranged in that order from the object. The photographing system of the viewing apparatus 200 is provided behind the second lens group 102 with a filter 103 and a CCD package 105 in that order from the object The CCD package 105 is provided with a CCD 106 serving as an image pick-up device, and a glass cover 104 positioned in front of the CCD 106. The filter 103 is a low-pass filter or an infrared absorbing filter. Although shown as a single filter in the drawing, the filter 103 can be more that one filter.

The photographing lens barrel 150 shown in FIG. 2 is provided with a fixed lens barrel 140 which accommodates and holds the second lens group 102, the filter 103 and the CCD package 105. The CCD package 105 is positioned at the rear end of the fixed lens barrel 140. The first lens group support frame 120 that holds the first lens group 101 is coaxially engaged with the front end of the fixed lens barrel 140.

The first lens group 101 is supported by the first lens group support frame 120, while the first lens group support frame 120 is supported by the fixed lens barrel 140 via a first helicoidal thread structure (i.e., a lens barrel drive structure using helicoidal threads) 125. The first helicoidal thread structure 125 is composed of a helicoidal male-threaded portion and a female helicoidal female-threaded portion which are engaged with each other, wherein the helicoidal male-threaded portion is formed on an outer peripheral surface of the fixed lens barrel 140 while the helicoidal female-threaded portion is formed on an inner peripheral surface of the first lens group support frame 120. Accordingly, the first lens group 101, which is supported by the first lens group support frame 120, moves along the optical axis O if rotated about the optical axis O relative to the fixed lens barrel 140.

The photographing lens barrel 150 is provided behind the first lens group support frame 120 with a second lens group support frame 130 which accommodates and supports the second lens group 102. The second lens group support frame 130 is supported by the fixed lens barrel 140 via a second helicoidal thread structure (i.e., a lens barrel drive structure using helicoidal threads) 135. The second helicoidal thread structure 135 is composed of a helicoidal male-threaded portion and a female helicoidal female-threaded portion which are engaged with each other, wherein the helicoidal male-threaded portion is formed on an outer peripheral surface of the second lens group support frame 130 while the helicoidal female-threaded portion is formed on an inner peripheral surface of the fixed lens barrel 140. Accordingly, the second lens group 102, which is supported by the second lens group support frame 130, moves along the optical axis O if rotated about the optical axis O relative to the fixed lens barrel 140.

The spur gear portion 151 is fixed to an outer peripheral surface of the first lens group support frame 120 to mesh with the front spur gear 51 (see FIG. 1) that is fixed to the front end of the drive shaft 52 Rotation of the manual focus knob 55 causes the first lens group support frame 120 to rotate via the spur gear 54, the rear spur gear 53, the front spur gear 51 and the spur gear portion 151. Consequently, the first lens group support frame 120, which is supported by the fixed lens barrel 140, moves along the optical axis O while rotating about the optical axis O relative to the fixed lens barrel 140 via the first helicoidal thread structure 125. Accordingly, in the first embodiment of the photographing lens barrel of the photographing system shown in FIG. 2, the first lens group 101 moves along the optical axis O by manually turning the manual focus knob 55 to focus the photographing system of the viewing apparatus 200 on an object. Namely, a focusing mechanism (the aforementioned first focusing mechanism) of the photographing system shown in FIG. 2 operates in association with a focusing mechanism of the binocular optical system shown in FIG. 1. The screw shaft 41 and the manual focus knob 55 are fundamental elements of the focusing mechanism of the binocular optical system shown in FIG. 1, while the spur gear portion 151 and the first helicoidal thread structure 125 are fundamental elements of the first focusing mechanism of the photographing system shown in FIG. 2.

The second lens group support frame 130 is provided, on an outer peripheral surface thereof at the rear end of the second lens group support frame 130, with a spur gear portion 161 provided about the optical axis O. The photographing lens barrel 150 is provided therein with an AF motor (focusing motor) 164 having a pinion gear 162 coaxially fixed to an output shaft 163 of the AF motor 164. The pinion 162 of the motor 164 is in mesh with the spur gear 161. The pinion gear 162 is driven by the motor 164 via the output shaft 163. The photographing system of the viewing apparatus 200 is provided with an active or passive type focus detection unit 170 (shown by one-dot chain line in FIG. 2) which is electrically connected to the AF motor 164. The AF motor 164 is driven in accordance with an amount of driving of the second lens group 102 determined by the focus detection unit 170. When the AF motor 164 rotates in accordance with a traveling distance of the second lens group 102 determined by the focus detection unit 170, the second lens group support frame 130 (the second lens group 102), which is supported by the fixed lens barrel 140 via the second helicoidal thread structure 135, moves along the optical axis O to bring an object into focus. The second helicoidal thread structure 135 and the AF motor 164 are fundamental elements of the second focusing mechanism of the photographing system shown in FIG. 2. Accordingly, both the absolute positions of the first and second lens groups 101 and 102 and the relative position of the first and second lens groups 101 and 102 are changed by the first and second focusing mechanisms of the photographing system to achieve a focusing operation of the photographing system of the viewing apparatus 200.

In the case where an object distance range from an infinite distance to a shortest object distance is constant, the traveling distance of an optical system from the infinite distance (lateral magnification=0) to the shortest object distance, which is necessary to bring an object into focus, becomes small since lateral magnification at the shortest object distance becomes smaller as the focal length of the optical system becomes shorter. Accordingly, in the case where an object distance range from an infinite distance to a shortest object distance is constant, the required focusing sensitivity is low.

The first embodiment of the photographing lens barrel shown in FIG. 2 satisfies the conditions (1) through (6) which will be hereinafter discussed.

Condition (1) specifies the focal length of the photographing optical system 100 to be appropriately shorter than that of the viewing optical system 1. By satisfying this condition, focusing precision required to the photographing optical system 100 can be made lower than that of the viewing optical system 1; and the focusing mechanism of the photographing optical system 100 can be operated in association with the focusing mechanism of the viewing optical system 1. Moreover, optical elements and structural members of the photographing optical system 100 can be formed in a size which can be easily processed and machined.

If ft/fo exceeds the upper limit of condition (1), the focal length of the photographing optical system 100 becomes too long. Consequently, associated movement between the focusing mechanism of the photographing optical system and the focusing mechanism of the viewing optical system 1 becomes difficult, and the size of the photographing optical system 100 becomes larger.

If ft/fo exceeds the lower limit of condition (1), the focal length of the photographing optical system 100 becomes too short. Consequently, the size of the lens elements which constitute the photographing optical system 100 becomes too small, so that manufacture thereof becomes difficult, and the cost thereof increases.

Condition (2) specifies a necessary condition for optimizing the controllability of the focusing systems of the viewing apparatus 200 by determining the respective traveling distance of the first and second lens groups 101 and 102.

If $|T_I/T_{II}|$ exceeds the lower limit of condition (2), the traveling distance of a focal point per unit of movement of the first lens group 101 of the photographing optical system 100 becomes so large that it becomes very difficult to perform a manual focusing operation by manually rotating the first lens group support frame 120 since even a slight amount of rotation of the first lens group support frame 120 causes the focal point to move largely.

If $T_I/T_{II}|$ exceeds the upper limit of condition (2), the traveling distance of a focal point per unit of movement of the second lens group 102 of the photographing optical system 100 becomes so large that it becomes very difficult to perform an autofocus operation using the AF motor 164, in the case of the photographing lens barrel 150 shown in FIG. 2, since even a slight amount of rotation of the AF motor 164 causes the focal point to move largely.

The following condition (3) specifies a necessary condition for making the field of view of each viewing optical system 1 relatively narrower by setting the magnification of each viewing optical system 1 at a relatively larger magnification in the case where the first and second lens groups 101 and 102 are moved independently of each other by the respective focusing mechanisms.

If each viewing optical system 1 is designed to have a narrower field of view, the angle of view of the photographing optical system combined with the pair of viewing optical systems 1 can be narrowed, which makes it possible to use a Petzval lens system as the photographing optical system 100.

If $f_O/f_e$ exceeds the lower limit of condition (3), the photographing optical system 100 needs to have a large angle of view. This complicates the lens arrangement of the photographing optical system 100, and increases the cost of production of the photographing optical system 100.

The following condition (4) specifies a necessary condition for ensuring a space for movement of the first and second lens groups 101 and 102 while preventing the photographing lens barrel from increasing in length by optimizing the space between the first and second lens groups 101 and 102.

If $D_{I-II}/f$ exceeds the lower limit of condition (4), the space between the first and second lens groups 101 and 102 becomes too small to ensure a space necessary for the first and second lens groups 101 and 102 to move along the optical axis O concurrently.

If $D_{I-II}/f$ exceeds the upper limit of condition (4), the length of the photographing lens barrel becomes excessively large.

Condition (5) is for lowering precision to be required to a lens frame by intensively performing the correcting of chromatic aberration in the positive first lens group 101. This means that a portion to which higher precision is required is only the positive first lens group 101 constituted by the cemented lens elements, while precision required to the lens frame is lowered, and manufacturing costs thereof decrease.

If $AC_I/AC_{II}$ exceeds the lower limit of condition (5), precision on the lens-frame required to the positive second lens group 102 has also to be made higher, as required to the lens frame of the positive first lens group 101. Consequently, manufacturing costs thereof increase.

The following condition (6) specifies a necessary condition for finely correcting chromatic aberration without increasing respective optical powers of the positive first lens element 111 and the negative second lens element 112 by increasing the difference between Abbe number of the positive first lens element 111 and Abbe number of the negative second lens element 112 in the first lens group 101 whose chromatic aberration correcting function is specified by Condition (5).

If "$v_{Ip}-v_{In}$" exceeds the lower limit of condition (6), respective powers of the positive first lens element 111 and the negative second lens element 112 have to be increased to make a fine correction to chromatic aberration. This causes high-order spherical and coma aberrations to occur excessively, which makes it impossible to obtain satisfactory optical performance, and which requires a high accuracy of the product since the fluctuations of the aberrations increase due to eccentricity of one or more lens elements, thus increasing the cost of production.

Figure 3:
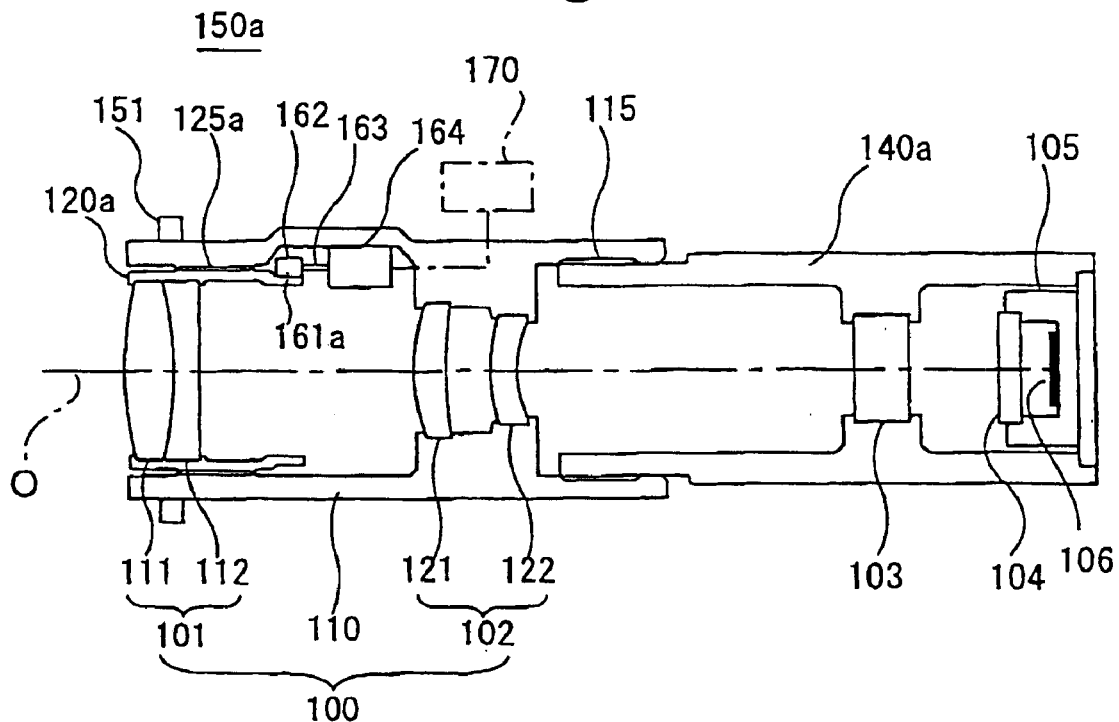
FIG. 3 is an axial cross sectional view of a second embodiment of the photographing lens barrel of the viewing apparatus shown in FIG. 1.

FIG. 3 shows the second embodiment of the photographing lens barrel of the viewing apparatus 200 shown in FIG. 1. The photographing optical system 100 provided in the photographing lens barrel 150a shown in FIG. 3 is of the same as the first embodiment of the photographing lens barrel shown in FIG. 2. The photographing lens barrel 150a shown in FIG. 3 is provided with a fixed lens barrel 140a which accommodates and holds the filter 103 and the CCD package 105. The photographing lens barrel 150a is provided in front of the fixed lens barrel 140a with a movable lens barrel 110 which is coaxially engaged with the front end of the fixed lens barrel 140a. The second lens group 102 is supported by the movable lens barrel 110. The movable lens barrel 110 is supported by the fixed lens barrel 140a via a first helicoidal thread structure (i.e., a lens barrel drive structure using helicoidal threads) 115. The first helicoidal thread structure 115 is composed of a helicoidal male-threaded portion and a female helicoidal female-threaded portion which are engaged with each other, wherein the helicoidal male-threaded portion is formed on an outer peripheral surface of the fixed lens barrel 140a while the helicoidal female-threaded portion is formed on an inner peripheral surface of the movable lens barrel 110.

The first lens group 101 is supported by a first lens group support frame 120a positioned in the movable lens barrel 110. The first lens group support frame 120a is supported by the movable lens barrel 110 via a second helicoidal thread structure (i.e., a lens barrel drive structure using helicoidal threads) 125a. The second helicoidal thread structure 125a is composed of a helicoidal male-threaded portion and a female helicoidal female-threaded portion which are engaged with each other, wherein the helicoidal male-threaded portion is formed on an outer peripheral surface of the first lens group support frame 120a while the helicoidal female-threaded portion is formed on an inner peripheral surface of the movable lens barrel 110. Accordingly, a rotation of the movable lens barrel 110 about the optical axis O relative to the fixed lens barrel 140a causes the whole photographing optical system 100, which consists of the first and second lens groups 101 and 102, to move along the optical axis O. On the other hand, a rotation of the first lens group support frame 120a about the optical axis O relative to the movable lens barrel 110 causes the first lens group 101 to move along the optical axis O relative to the second lens group 102.

The first lens group support frame 120a is provided on an outer peripheral surface thereof with a spur gear portion 151 positioned about the optical axis O. The spur gear portion 151 meshes with the front spur gear 51 shown in FIG. 1. Rotation of the manual focus knob 55 causes the movable lens barrel 110 to rotate via the spur gear 54, the rear spur gear 53, the front spur gear 51 and the spur gear portion 151. Accordingly, in the second embodiment of the photographing lens barrel of the photographing system shown in FIG. 3, the first and second lens groups 101 and 102 concurrently move along the optical axis O by manually turning the manual focus knob 55 to focus the photographing system of the viewing apparatus 200 on an object. Namely, a focusing mechanism (the aforementioned first focusing mechanism) of the photographing system shown in FIG. 3 is interconnected with a focusing mechanism of the binocular optical system shown in FIG. 1 so as to operate in association therewith. The screw shaft 41 and the manual focus knob 55 are fundamental elements of the focusing mechanism of the binocular optical system shown in FIG. 1, while the spur gear portion 151 and the first helicoidal thread structure 115 are fundamental elements of the first focusing mechanism of the photographing system shown in FIG. 3.

The first lens group support frame 120a is provided, on an outer peripheral surface thereof at the rear end of the first lens group support frame 120a, with a spur gear portion 161a positioned about the optical axis O. Similar to the photographing lens barrel 150a shown in FIG. 2, the photographing lens barrel 150a is provided therein with an AF motor (focusing motor) 164 having a pinion gear 162 coaxially fixed to an output shaft 163 of the AF motor 164. The pinion 162 of the motor 164 is in mesh with the spur gear 161a of the first lens group support frame 120a. The pinion gear 162 is driven by the motor 164 via the output shaft 163. The AF motor 164 is driven in accordance with an amount of driving of the first lens group 101 determined by the focus detection unit 170. When the AF motor 164 rotates in accordance with an amount of driving of the first lens group 101 determined by the focus detection unit 170, the first lens group support frame 120a (the first lens group 101), which is supported by the movable lens barrel 110 via the second helicoidal thread structure 125a, moves along the optical axis O to bring an object into focus. The second helicoidal thread structure 125a and the AF motor 164 are fundamental elements of the second focusing mechanism of the photographing system shown in FIG. 3. Accordingly, both the absolute positions of the first and second lens groups 101 and 102 and the relative position of the first and second lens groups 101 and 102 are changed by the first and second focusing mechanisms of the photographing system to achieve a focusing operation of the photographing system of the viewing apparatus 200.

The second embodiment of the photographing lens barrel shown in FIG. 3 satisfies the conditions (7) through (12). The conditions (7), and (9) through (12) are identical to the conditions (1), and (3) through (6), and thus the explanations of the conditions (7), and (9) through (12) are herein omitted.

Condition (8) specifies a necessary condition for optimizing the controllability of the focusing systems of the viewing apparatus 200 that incorporates the first and second lens groups 101 and 102 by determining the traveling distance of the whole photographing optical system 100 and the traveling distance of the first lens group 101 by the first and second focusing mechanisms, respectively, in the case of the second embodiment of the photographing lens barrel shown in FIG. 3 where the whole photographing optical system 100 and the first lens group 101 are driven by the first and second focusing mechanisms, respectively. In other words, the photographing optical system is moved along a predetermined moving path, and the first lens group 101 is moved along a moving path different from the predetermined moving path of the photographing optical system.

If $|T_A/T_I|$ exceeds the upper limit condition (8), the traveling distance of a focal point per unit of movement of the first lens group 101 of the photographing optical system 100 becomes so large that it becomes very difficult to perform an autofocus operation using the AF motor 164 since even a slight amount of rotation of the AF motor 164 causes the focal point to move largely.

If $|T_A/T_I|$ exceeds the lower limit of condition (8), the traveling distance of a focal point per unit of movement of the whole photographing optical system 100 becomes so large that it becomes very difficult to perform a manual focusing operation by manually rotating the manual focus knob 55 since even a slight amount of rotation of the manual focus knob 55 causes the focal point to move largely.

Figure 4:
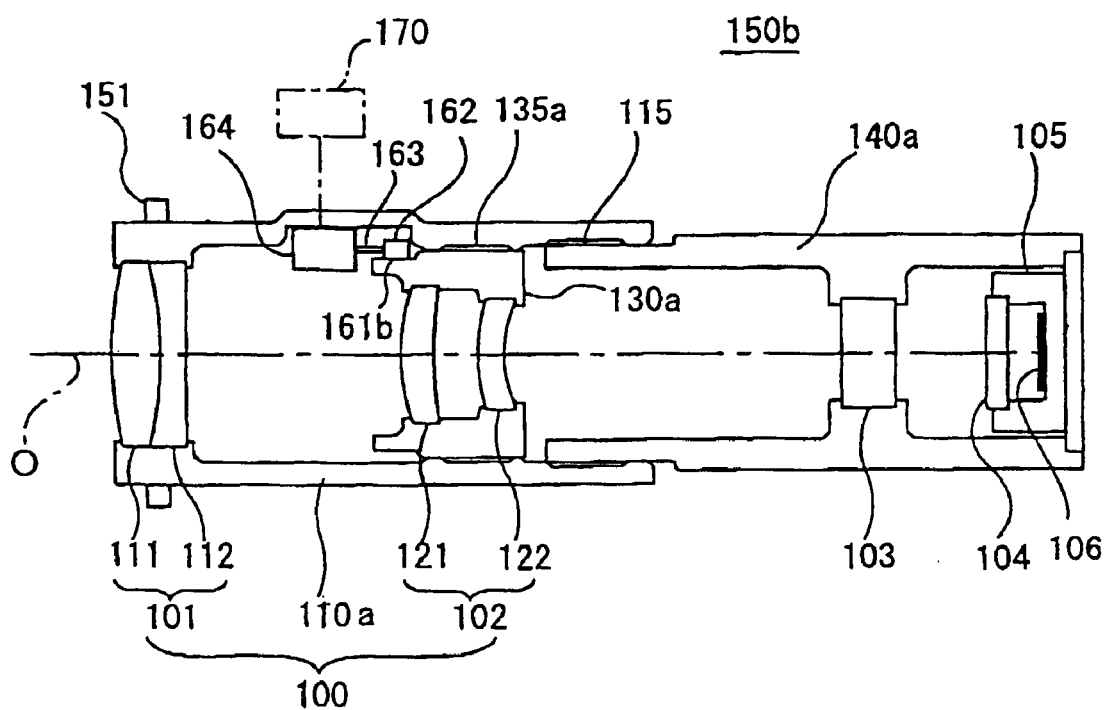
FIG. 4 is an axial cross sectional view of a third embodiment of the photographing lens barrel of the viewing apparatus shown in FIG. 1.

FIG. 4 shows the third embodiment of the photographing lens barrel of the viewing apparatus 200 shown in FIG. 1. The photographing optical system 100 provided in the photographing lens barrel 150b shown in FIG. 4 is the same as that of the first embodiment of the photographing lens barrel shown in FIG. 2. Similar to the photographing lens barrel 150a shown in FIG. 3, the photographing lens barrel 150b shown in FIG. 4 is provided with a fixed lens barrel 140a which accommodates and holds the filter 103 and the CCD package 105. The photographing lens barrel 150b is provided in front of the fixed lens barrel 140a with a movable lens barrel 110a which is coaxially engaged with the front end of the fixed lens barrel 140a. The movable lens barrel 110a is supported by the fixed lens barrel 140a via a first helicoidal thread structure (i.e., a lens barrel drive structure using helicoidal threads) 115 in a manner similar to that of the second embodiment of the photographing lens barrel shown in FIG. 3. The first lens group 110a is supported by the movable lens barrel 110a at the front end thereof.

The photographing lens barrel 150b is provided, in the movable lens barrel 110a in front of the fixed lens barrel 140a, with a second lens group support frame 130a which accommodates and supports the second lens group 102. The second lens group support frame 130a is supported by the movable lens barrel 110a via a second helicoidal thread structure (i.e., a lens barrel drive structure using helicoidal threads) 135a. The second helicoidal thread structure 135a is composed of a helicoidal male-threaded portion and a female helicoidal female-threaded portion which are engaged with each other, wherein the helicoidal male-threaded portion is formed on an outer peripheral surface of the second lens group support frame 130a while the helicoidal female-threaded portion is formed on an inner peripheral surface of the movable lens barrel 110a. Accordingly, a rotation of the movable lens barrel 110a about the optical axis O relative to the fixed lens barrel 140 causes the whole photographing optical system 100, which consists of the first and second lens groups 101 and 102, to move along the optical axis O. On the other hand, a rotation of the second lens group support frame 130a relative to the movable lens barrel 110a about the optical axis O causes the second lens group 102 to move along the optical axis O relative to the first lens group 101. Accordingly, both the absolute positions of the first and second lens groups 101 and 102 and the relative position of the first and second lens groups 101 and 102 are changed by the first and second focusing mechanisms of the photographing system to achieve a focusing operation of the photographing system of the viewing apparatus 200.

The movable lens barrel 110a is provided on an outer peripheral surface thereof with a spur gear portion 151 positioned about the optical axis O. The spur gear portion 151 meshes with the front spur gear 51 shown in FIG. 1. A rotation of the manual focus knob 55 causes the movable lens barrel 110a to rotate via the spur gear 54, the rear spur gear 53, the front spur gear 51 and the spur gear portion 151. At this time, the movable lens barrel 110a rotates about the optical axis O while moving along the optical axis O relative to the fixed lens barrel 140a due to the first helicoidal thread structure 115. Accordingly, in the third embodiment of the photographing lens barrel of the photographing system shown in FIG. 4, the first and second lens groups 101 and 102 concurrently move along the optical axis O by manually turning the manual focus knob 55 to focus the photographing system of the viewing apparatus 200 on an object. Namely, a focusing mechanism (the aforementioned first focusing mechanism) of the photographing system shown in FIG. 4 is geared to a focusing mechanism of the binocular optical system shown in FIG. 1. The screw shaft 41 and the manual focus knob 55 are fundamental elements of the focusing mechanism of the binocular optical system shown in FIG. 1, and the spur gear portion 151 and the first helicoidal thread structure 115 are fundamental elements of the first focusing mechanism of the photographing system shown in FIG. 4.

The second lens group support frame 130a is provided, on an outer peripheral surface thereof at the front end of the second lens group support frame 130a, with a spur gear portion 161b positioned about the optical axis O. The photographing lens barrel 150b is provided therein with an AF motor (focusing motor) 164 having a pinion gear 162 coaxially fixed to an output shaft 163 of the AF motor 164. The pinion 162 of the motor 164 is in mesh with the spur gear 161b. The pinion gear 162 is driven by the motor 164 via the output shaft 163. When the AF motor 164 rotates in accordance with an amount of driving of the second lens group 102 determined by the focus detection unit 170, the second lens group support frame 130a (the second lens group 102), which is supported by the movable lens barrel 110a via the second helicoidal thread structure 135a, moves along the optical axis O relative to the first lens group 101 to bring an object into focus. The second helicoidal thread structure 135a and the AF motor 164 are fundamental elements of the second focusing mechanism of the photographing system shown in FIG. 4. Accordingly, both the absolute positions of the first and second lens groups 101 and 102 and the relative position of the first and second lens groups 101 and 102 are changed by the first and second focusing mechanisms of the photographing system to achieve a focusing operation of the photographing system of the viewing apparatus 200.

The third embodiment of the photographing lens barrel shown in FIG. 4 satisfies the conditions (13) through (18). The conditions (13), and (15) through (18) are identical to the conditions (1), and (3) through (6), and thus the explanations of the conditions (13), and (15) through (18) are herein omitted.

The above condition (14) specifies a necessary condition for optimizing the controllability of the focusing systems of the viewing apparatus by determining the traveling distance of the whole photographing optical system 100 and the traveling distance of the second lens group 102 by the first and second focusing mechanisms, respectively, in the case of the third embodiment of the photographing lens barrel shown in FIG. 4 where the whole photographing optical system 100 and the second lens group 102 are driven by the first and second focusing mechanisms, respectively. In other words, the photographing optical system is moved along a predetermined moving path, and the second lens group 102 is moved along a moving path different from the predetermined moving path of the photographing optical system.

If $|T_A/T_{II}|$ exceeds the lower limit of condition (14), the traveling distance of a focal point per unit of movement of the whole photographing optical system 100 becomes so large that it becomes very difficult to perform a manual focusing operation by manually rotating the manual focus knob 55 since even a slight amount of rotation of the manual focus knob 55 causes the focal point to move largely.

If $|T_A/T_{II}|$ exceeds the upper limit of condition (14), the traveling distance of a focal point per unit of movement of the second lens group 102 of the photographing optical system 100 becomes so large that it becomes very difficult to perform an autofocus operation using the AF motor 164 since even a slight amount of rotation of the AF motor 164 causes the focal point to move largely.

Specific numerical data of the embodiments will be described hereinafter. Note that the following embodiments include an embodiment of the viewing optical system 1, and first through fifth embodiments of the photographing optical system 100.

In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image, ER designates the radius of the exit pupil, and B designates the apparent visual angle (half amount, °) In the tables, DP designates the diopter (1/m) with respect to a viewed object at infinity, FNo designates the f-number, f designates the focal length of the entire zoom lens system, $f_B$ designates the back focal distance, w designates the half angle-of-view (°), r designates the radius of curvature, d designates the lens-element thickness or distance between lens elements, $N_d$ designates the refractive index of the d-line, and $v_d$ designates the Abbe number.

In addition to the above, an a spherical surface which is symmetrical with respect to the optical axis is defined as follows:

$$x=cy^2/(1+[1=\{1+K\}c^2y^2]^{1/2})+A4y^4+A6y^6+A8y^8+A10y^{10} \ldots$$

wherein:

c designates a curvature of the a spherical vertex (1/r);

y designates a distance from the optical axis;

K designates the conic coefficient; and

A4 designates a fourth-order a spherical coefficient;

A6 designates a sixth-order a spherical coefficient;

A8 designates a eighth-order a spherical coefficient; and

A10 designates a tenth-order a spherical coefficient.

[Embodiment of Viewing Optical System]

FIG. 5 is the optical arrangement of an embodiment of each viewing optical system 1 of the viewing apparatus shown in FIG. 1, wherein two prisms of an erecting optical system of the viewing optical system 1 are shown as developed views. FIGS. 6A through 6D show aberrations occurred in the optical arrangement shown in FIG. 5. Table 1 below shows the numerical data of the embodiment shown in FIG. 5.

TABLE 1

W = 3.6
Diopter [dptr] = −1.03

| Surface No. | R | D | Nd | vd |
|---|---|---|---|---|
| 1 | 42.680 | 3.600 | 1.51633 | 64.1 |
| 2 | −26.766 | 1.500 | 1.62004 | 36.3 |
| 3 | −88.200 | 19.020 | — | — |
| 4 | ∞ | 22.890 | 1.51633 | 64.1 |
| 5 | ∞ | 2.000 | — | — |
| 6 | ∞ | 33.150 | 1.51633 | 64.1 |
| 7 | ∞ | 8.470 | — | — |
| 8* | −30.030 | 5.000 | 1.49176 | 57.4 |
| 9 | −7.700 | 2.540 | — | — |
| 10 | 19.310 | 5.750 | 1.69680 | 55.5 |
| 11 | −8.190 | 1.200 | 1.78472 | 25.7 |
| 12 | −16.161 | — | — | — |

*designates the aspherical surface which is rotationally symmetrical with respect to the optical axis.

A spherical surface data (the aspherical surface coefficients not indicated are zero (0.00)):

| Surf. No. | K | A4 | A6 | A8 |
|---|---|---|---|---|
| 8 | 0.00000 | −1.825 × 10⁻³ | 5.027 × 10⁻⁵ | −1.303 × 10⁻⁶ |

Each of the first through fifth embodiments of the fundamental optical elements shown in FIG. 7 which will be hereinafter discussed can be used in any one of the aforementioned first through third embodiments of the photographing lens barrels shown in FIGS. 2, 3 and 4, respectively. Namely, in any of the following first through three cases: the first case where the first lens group 101 and the second group 102 are driven by the first and second lens drive mechanisms, respectively; the second case where the whole photographing lens group 100 and the first lens group 101 are driven by the first and second lens drive mechanisms, respectively; and the third case where the whole photographing lens group 100 and the second lens group 102 are driven by the first and second lens drive mechanisms, respectively.

FIG. 7 shows the optical arrangement of fundamental optical elements (the first lens group 101, the second lens group 102, the filter 103 and the glass cover 104) of any one of the photographing lens barrels shown in FIGS. 2, 3 and 4.

[Embodiment 1 of the Photographing Optical System]

Table 2 below shows the numerical data of a first embodiment of the fundamental optical elements shown in FIG. 7 of the photographing optical system 100. FIGS. 8A through 8D show various aberrations in the first embodiment of the photographing optical system 100, the optical elements thereof being formed according to the numerical data shown in Table 2.

TABLE 2

FNo. = 1:4.0
f = 37.09
W = 4.6
FB = 0.50

| Surface No. | R | D | Nd | vd |
|---|---|---|---|---|
| 1 | 20.848 | 2.300 | 1.51633 | 64.1 |
| 2 | −21.287 | 1.200 | 1.62004 | 36.3 |
| 3 | 1382.836 | 10.000 | — | — |
| 4 | 10.975 | 1.500 | 1.56384 | 60.7 |
| 5 | 27.139 | 2.000 | — | — |
| 6 | 10.799 | 1.200 | 1.59551 | 39.2 |
| 7 | 6.500 | 12.572 | — | — |
| 8 | ∞ | 2.500 | 1.51633 | 64.1 |
| 9 | ∞ | 5.000 | — | — |
| 10 | ∞ | 1.000 | 1.51633 | 64.1 |
| 11 | ∞ | — | — | — |

| | *Focusing at Infinity | Movement of Entire Optical System | Movement of First Lens Group | Movement of Second Lens Group |
|---|---|---|---|---|
| M | 0.00 | −0.02 | −0.02 | −0.02 |
| D3 | 10.000 | 10.000 | 11.397 | 8.435 |
| D7 | 12.572 | 13.314 | 12.572 | 14.137 |
| FB | 0.50 | 0.50 | 0.50 | 0.50 |

*Focusing at infinity means that an object at an infinite distance is in an in-focus state

[Embodiment 2 of the Photographing Optical System]

Table 3 below shows the numerical data of a second embodiment of the fundamental optical elements shown in FIG. 7 of the photographing optical system 100. FIGS. 9A through 9D show various aberrations in the second embodiment of the photographing optical system, the optical elements thereof being formed according to the numerical data shown in Table 3.

TABLE 3

FNo. = 1:4.0
f = 37.16
W = 4.6
FB = 0.50

| Surface No. | R | D | Nd | vd |
|---|---|---|---|---|
| 1 | 18.992 | 2.300 | 1.48749 | 70.2 |
| 2 | −15.875 | 1.200 | 1.54814 | 45.8 |
| 3 | 266.527 | 10.000 | — | — |
| 4 | 9.825 | 1.500 | 1.51633 | 64.1 |
| 5 | 27.922 | 0.493 | — | — |
| 6 | 11.257 | 1.200 | 1.58144 | 40.7 |
| 7 | 6.500 | 14.496 | — | — |
| 8 | ∞ | 2.500 | 1.51633 | 64.1 |
| 9 | ∞ | 5.000 | — | — |
| 10 | ∞ | 1.000 | 1.51633 | 64.1 |
| 11 | ∞ | — | — | — |

| *Focusing at Infinity | Movement of Entire Optical System | Movement of First Lens Group | Movement of Second Lens Group |
|---|---|---|---|
| M | 0.00 | −0.02 | −0.02 | −0.02 |
| D3 | 10.000 | 10.000 | 11.338 | 8.352 |
| D7 | 14.496 | 15.239 | 14.496 | 16.144 |
| FB | 0.50 | 0.50 | 0.50 | 0.50 |

*Focusing at infinity means that an object at an infinite distance is in an in-focus state

[Embodiment 3 of the Photographing Optical System]

Table 4 below shows the numerical data of a third embodiment of the fundamental optical elements shown in FIG. 7 of the photographing optical system 100. FIGS. 10A through 10D show various aberrations in the third embodiment of the photographing optical system 100, the optical elements thereof being formed according to the numerical data shown in Table 4.

TABLE 4

FNo. = 1:4.0
f = 37.13
W = 4.6
FB = 0.50

| Surface No. | R | D | Nd | vd |
|---|---|---|---|---|
| 1 | 19.386 | 2.300 | 1.49700 | 81.6 |
| 2 | −16.785 | 1.200 | 1.54072 | 47.2 |
| 3 | 119.078 | 9.133 | — | — |
| 4 | 11.771 | 1.500 | 1.58913 | 61.2 |
| 5 | 24.222 | 2.000 | — | — |
| 6 | 9.995 | 1.500 | 1.56732 | 42.8 |
| 7 | 6.500 | 13.110 | — | — |
| 8 | ∞ | 2.500 | 1.51633 | 64.1 |
| 9 | ∞ | 5.000 | — | — |
| 10 | ∞ | 1.000 | 1.51633 | 64.1 |
| 11 | ∞ | — | — | — |

| *Focusing at Infinity | Movement of Entire Optical System | Movement of First Lens Group | Movement of Second Lens Group |
|---|---|---|---|
| M | 0.00 | −0.02 | −0.02 | −0.02 |
| D4 | 9.133 | 9.133 | 10.648 | 7.693 |
| D7 | 13.110 | 13.853 | 13.110 | 14.550 |
| FB | 0.50 | 0.50 | 0.50 | 0.50 |

*Focusing at infinity means that an object at an infinite distance is in an in-focus state

[Embodiment 4 of the Photographing Optical System]

Table 5 below shows the numerical data of a fourth embodiment of the fundamental optical elements shown in FIG. 7 of the photographing optical system 100. FIGS. 11A through 11D show various aberrations in the fourth embodiment of the photographing optical system 100, the optical elements thereof being formed according to the numerical data shown in Table 5. The fundamental construction of the third embodiment is the same as the optical arrangement shown in FIG. 7 except for the positive first lens element 111 and the negative second lens element 112 being separate from each other.

(0058)

TABLE 5

FNo. = 1:4.0
f = 37.11
W = 4.6
FB = 0.50

| Surface No. | R | D | Nd | vd |
|---|---|---|---|---|
| 1 | 20.400 | 2.500 | 1.49700 | 81.6 |
| 2 | −17.175 | 0.200 | — | — |
| 3 | −16.637 | 1.200 | 1.54072 | 47.2 |
| 4 | 117.829 | 10.000 | — | — |
| 5 | 11.196 | 1.500 | 1.58913 | 61.2 |
| 6 | 30.676 | 2.000 | — | — |
| 7 | 10.819 | 1.200 | 1.56732 | 42.8 |
| 8 | 6.500 | 13.088 | — | — |
| 9 | ∞ | 2.500 | 1.51633 | 64.1 |
| 10 | ∞ | 5.000 | — | — |
| 11 | ∞ | 1.000 | 1.51633 | 64.1 |
| 12 | ∞ | — | — | — |

| *Focusing at Infinity | Movement of Entire Optical System | Movement of First Lens Group | Movement of Second Lens Group |
|---|---|---|---|
| M | 0.00 | −0.02 | −0.02 | −0.02 |
| D3 | 10.000 | 10.000 | 11.864 | 8.781 |
| D7 | 13.088 | 13.830 | 13.088 | 14.307 |
| FB | 0.50 | 0.50 | 0.50 | 0.50 |

*Focusing at infinity means that an object at an infinite distance is in an in-focus state (0059)

[Embodiment 5 of the Photographing Optical System]

Table 6 below shows the numerical data of a fifth embodiment of the fundamental optical elements shown in FIG. 7 of the photographing optical system 100. FIGS. 12A through 12D show various aberrations in the fifth embodiment of the photographing optical system 100, the optical elements thereof being formed according to the numerical data shown in Table 6. In this embodiment, similar to the fourth embodiment of fundamental construction of the third embodiment is the same as the optical arrangement shown in FIG. 7 except for the positive first lens element 111 and the negative second lens element 112 being separate from each other.

TABLE 6

FNo. = 1:4.0
f = 37.06
W = 4.6
FB = 0.50

| Surface No. | R | D | Nd | vd |
|---|---|---|---|---|
| 1 | 18.637 | 2.500 | 1.49700 | 81.6 |
| 2 | −16.820 | 0.200 | — | — |
| 3 | −16.253 | 1.200 | 1.54072 | 47.2 |
| 4 | 341.443 | 14.581 | — | — |
| 5 | 11.454 | 1.500 | 1.58913 | 61.2 |
| 6 | 23.116 | 1.167 | — | — |
| 7 | 10.328 | 1.200 | 1.56732 | 42.8 |
| 8 | 6.500 | 9.175 | — | — |
| 9 | ∞ | 2.500 | 1.51633 | 64.1 |

TABLE 6-continued

| 10 | ∞ | 5.000 | — | — |
| 11 | ∞ | 1.000 | 1.51633 | 64.1 |
| 12 | ∞ | — | — | — |

| | *Focusing at Infinity | Movement of Entire Optical System | Movement of First Lens Group | Movement of Second Lens Group |
|---|---|---|---|---|
| M  | 0.00   | −0.02  | −0.02  | −0.02  |
| D3 | 14.581 | 14.581 | 15.695 | 12.397 |
| D7 | 9.175  | 9.916  | 9.175  | 11.359 |
| FB | 0.50   | 0.50   | 0.50   | 0.50   |

*Focusing at infinity means that an object at an infinite distance is in an in-focus state Table 7 below shows specific numerical values in the conditions (1) through (6), (8) and (14) in the first through fifth embodiments of the photographing optical system 100, the fundamental optical elements thereof being represented by the numerical data shown in Table 2 through 6, respectively.

TABLE 7

| | Embod. 1 | Embod. 2 | Embod. 3 | Embod. 4 | Embod. 5 |
|---|---|---|---|---|---|
| Viewing Optical System | | | | | |
| Cond. (3) | 7.0 | | | | |
| Photographing Optical System | | | | | |
| Condition (1)  | 0.560 | 0.561 | 0.561 | 0.561 | 0.560 |
| Condition (2)  | 0.893 | 0.812 | 1.052 | 1.528 | 0.510 |
| Condition (4)  | 0.270 | 0.269 | 0.246 | 0.269 | 0.393 |
| Condition (5)  | 1.156 | 1.142 | 1.386 | 1.103 | 1.267 |
| Condition (6)  | 27.8  | 24.4  | 34.4  | 34.4  | 34.4  |
| Condition (8)  | 0.531 | 0.556 | 0.490 | 0.398 | 0.665 |
| Condition (14) | 0.474 | 0.451 | 0.516 | 0.609 | 0.339 |
| Viewing Optical System | | | | | |
| fo = | 66.19 | | | | |
| fe = | 9.43  | | | | |
| Photographing Optical System | | | | | |
| ft = | 37.09 | 37.16 | 37.13 | 37.11 | 37.06 |
| $T_I$ = | 1.397 | 1.338 | 1.515 | 1.864 | 1.114 |
| $T_{II}$ = | −1.565 | −1.648 | −1.440 | −1.219 | −2.184 |
| $T_A$ = | 0.742 | 0.743 | 0.743 | 0.742 | 0.741 |
| $AC_I$ = | 0.0016 | 0.0016 | 0.0014 | 0.0014 | 0.0014 |
| $AC_{II}$ = | 0.0014 | 0.0014 | 0.0010 | 0.0013 | 0.0011 |

As can be understood from Table 7, each embodiment satisfies each condition, and as can be understood from the aberration diagrams, the various aberrations are adequately corrected.

As can be understood from the foregoing, according to the present invention, a viewing optical system having both a distant-object viewing function and a distant-object-image recording function is achieved at a low cost of production without increasing the size of the optical system. In addition, such a viewing optical system which achieves an easy operability in focusing operation is achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A viewing apparatus having a photographing function, comprising:
  a viewing system including a viewing optical system, said viewing optical system having a positive objective optical system and an eyepiece optical system, an image of an object formed through said positive objective optical system being viewed through said eyepiece optical system; and
  a photographing system including a photographing optical system for photographing said object image viewed through said eyepiece optical system, said photographing optical system being provided independently of said viewing optical system;
  wherein said photographing optical system comprises a first lens group and a second lens group; and
  wherein said photographing system comprises two focusing mechanisms, which operate independently from each other, for changing both absolute positions of said first lens group and said second lens group and a relative position of said first lens group and said second lens group on an optical axis of said photographing optical system.

2. The viewing apparatus having a photographing function according to claim 1, wherein said first lens group and said second lens group are arranged in that order from an object, said two focusing mechanisms moving said first lens group and said second lens group along said optical axis independent of each other to shift an image of said object to a predetermined point; and
  wherein the following conditions are satisfied:

$$0.1 < f_t/f_0 < 0.7$$

$$0.4 < |T_I/T_{II}| < 2.5$$

wherein
  "$f_t$" represents the focal length of said photographing optical system;
  "$f_o$" represents the focal length of said positive objective optical system of said viewing optical system;
  "$T_I$" represents the traveling distance of said first lens group necessary for achieving focus from an infinite distance to a finite object distance; and
  "$T_{II}$" represents the traveling distance of said second lens group necessary for achieving focus from an infinite distance to said finite object distance.

3. The viewing apparatus having a photographing function according to claim 1, wherein said eyepiece optical system has a positive power, and wherein the following condition is satisfied:

$$5 < f_O/f_e$$

wherein
  "$f_O$" represents the focal length of said objective optical system of said viewing optical system; and
  "$f_e$" represents the focal length of said eyepiece optical system of said viewing optical system.

4. The viewing apparatus having a photographing function according to claim 1, wherein said viewing apparatus comprises:
  a first focusing mechanism for moving at least one optical element of said viewing optical system along said optical axis to shift an object image formed by said photographing optical system, to a given point;
  a second focusing mechanism for moving one of said first lens group and said second lens group to shift an image formed by said photographing optical system; and an association mechanism which interconnects said first focusing mechanism with said second focusing mechanism to allow said first focusing mechanism to operate in association with said second focusing mechanism.

5. The viewing apparatus having a photographing function according to claim 1, wherein said viewing system comprises a telescope, wherein said eyepiece optical system has positive power, and wherein an image formed through said positive objective optical system is viewed through said positive eyepiece optical system.

6. The viewing apparatus having a photographing function according to claim 1, wherein said photographing system further comprises an image pick-up device, an object image being focused on said image pick-up device through said photographing optical system to be recorded as image data.

7. The viewing apparatus having a photographing function according to claim 1, wherein said photographing optical system comprises a positive first lens group having a positive lens element and a negative lens element, and a positive second lens group having a positive lens element and a negative lens element, and wherein the following condition is satisfied:

$$0.15 < D_{I-II}/f < 0.7$$

wherein

"$D_{I-II}$" represents the space between said first lens group and said second lens groups when an object at infinity is in an in-focus state; and "f" represents the focal length of said photographing optical system.

8. The viewing apparatus having a photographing function according to claim 7, wherein the following conditions are satisfied:

$$1 < AC_I/AC_{II}$$

$$20 < v_{Ip}/v_{In}$$

wherein

"$AC_I$" represents the sum of the absolute values of the reciprocals of the products of the focal length of each lens element and Abbe numbers thereof ($|1/(fi*vi)|$) in said first lens group;

"$AC_{II}$" represents the sum of the absolute values of the reciprocals of the products of the focal length of each lens element and Abbe numbers thereof ($|1/(fi*vi)|$) in said second lens group;

"$v_{Ip}$" represents Abbe number of said positive lens element of said first lens group; and "$v_{In}$" represents Abbe number of said negative lens element of said first lens group.

9. The viewing apparatus having a photographing function according to claim 8, wherein said positive lens element of said first lens group and said negative lens element of said first lens group are cemented to each other.

10. The viewing apparatus having a photographing function according to claim 1, wherein said first lens group and said second lens group are arranged in that order from an object;

wherein one of said two focusing mechanisms moves said photographing optical system along said optical axis;

wherein the other of said two focusing mechanisms moves said first lens group along said optical axis independently; and wherein the following conditions are satisfied;

$$0.1 < f_t/f_O < 0.7$$

$$0.2 < |T_A/T_I| < 1.5$$

wherein

"$f_t$" represents the focal length of said photographing optical system;

"$f_O$" represents the focal length of said objective optical system of said viewing optical system;

"$T_A$" represents the traveling distance of said photographing optical system necessary for achieving focus from an infinite distance to a finite object distance; and "$T_I$" represents the traveling distance of said first lens group necessary for achieving focus from an infinite distance to said finite object distance.

11. The viewing apparatus having a photographing function according to claim 10, wherein said eyepiece optical system has a positive power, and wherein the following condition is satisfied:

$$5 < f_O/f_e$$

wherein

"$f_O$" represents the focal length of said objective optical system of said viewing optical system; and "$f_e$" represents the focal length of said eyepiece optical system of said viewing optical system.

12. The viewing apparatus having a photographing function according to claim 10, wherein said viewing apparatus comprises:

a first focusing mechanism for moving at least one optical element of said viewing optical system along said optical axis in accordance with a variation of an object distance to shift an image of said object to a predetermined point;

a second focusing mechanism for moving one of said photographing optical system and said first lens group; and an association mechanism which interconnects said first focusing mechanism with said second focusing mechanism to allow said first focusing mechanism to operate in association with said second focusing mechanism.

13. The viewing apparatus having a photographing function according to claim 10, wherein said viewing system comprises a telescope, wherein said eyepiece optical system has a positive power, and wherein an image formed through said positive objective optical system is viewed through said positive eyepiece optical system.

14. The viewing apparatus having a photographing function according to claim 10, wherein said photographing system further comprises an image pick-up device, an object image being focused on said image pick-up device through said photographing optical system to be recorded as image data.

15. The viewing apparatus having a photographing function according to claim 10, wherein said photographing optical system comprises a positive first lens group having a positive lens element and a negative lens element, and a positive second lens group having a positive lens element and a negative lens element, and wherein the following condition is satisfied:

$$0.15 < D_{I-II}/f < 0.7$$

wherein

"$D_{I-II}$" represents the space between said first lens group and said second lens groups when an object at infinity is in an in-focus state; and "f" represents the focal length of said photographing optical system.

16. The viewing apparatus having a photographing function according to claim 15, wherein the following conditions are satisfied:

$$1 < AC_I/AC_{II}$$

$$20 < v_{Ip}/v_{In}$$

wherein

"$AC_I$" represents the sum of the absolute values of the reciprocals of the products of the focal length of each lens element and Abbe numbers thereof ($|1/(fi*vi)|$) in said first lens group;

"$AC_{II}$" represents the sum of th absolute values of the reciprocals of the products of the focal length of each lens element and Abbe numbers thereof ($|1/(fi*vi)|$) in said second lens group;

"$v_{Ip}$" represents Abbe number of said positive lens element of said first lens group; and "$v_{In}$" represents Abbe number of said negative lens element of said first lens group.

17. The viewing apparatus having a photographing function according to claim 15, wherein said positive lens element of said first lens group and said negative lens element of said first lens group are cemented to each other.

18. The viewing apparatus having a photographing function according to claim 1, wherein said first lens group and said second lens group are arranged in that order from an object;

wherein one of said two focusing mechanisms moves said photographing optical system along said optical axis;

wherein the other of said two focusing mechanisms moves said second lens group along said optical axis independently; and wherein the following conditions are satisfied:

$$0.1 < f_t/f_0 < 0.7$$

$$0.2 < |T_A/T_{II}| < 1.5$$

wherein

"$f_t$" represents the focal length of said photographing optical system;

"$f_0$" represents the focal length of said objective optical system of said viewing optical system;

"$T_A$" represents the traveling distance of said photographing optical system necessary for achieving focus from an infinite distance to a finite object distance; and "$T_{II}$" represents the traveling distance of said second lens group necessary for achieving focus from an infinite distance to said finite object distance.

19. The viewing apparatus having a photographing function according to claim 18, wherein said eyepiece optical system has a positive power, and wherein the following condition is satisfied:

$$5 < f_0/f_t$$

wherein

"$f_0$" represents the focal length of said objective optical system of said viewing optical system; and "$f_t$" represents the focal length of said eyepiece optical system of said viewing optical system.

20. The viewing apparatus having a photographing function according to claim 18, wherein said viewing apparatus comprises:

a first focusing mechanism for moving at least one optical element of said viewing optical system along said optical axis in accordance with a variation of an object distance to shift an image of said object to a given point;

a second focusing mechanism for moving one of said photographing optical system and said second lens group; and an association mechanism which interconnects said first focusing mechanism with said second focusing mechanism to allow said first focusing mechanism to operate in association with said second focusing mechanism.

21. The viewing apparatus having a photographing function according to claim 18, wherein said viewing system serves as a telescope, wherein said eyepiece optical system has a positive power, and wherein an image formed through said positive objective optical system is viewed through said positive eyepiece optical system.

22. The viewing apparatus having a photographing function according to claim 18, wherein said photographing system further comprises an image pick-up device, an object image being focused on said image pick-up device through said photographing optical system to be recorded as image data.

23. The viewing apparatus having a photographing function according to claim 18, wherein said photographing optical system comprises a positive first lens group including a positive lens element and a negative lens element, and a positive second lens group including a positive lens element and a negative lens element, and wherein the following condition is satisfied:

$$0.15 < D_{I-II}/f < 0.7$$

wherein

"$D_{I-II}$" represents the space between said first lens group and said second lens groups when an object at infinity is in an in-focus state; and "f" represents the focal length of said photographing optical system.

24. The viewing apparatus having a photographing function according to claim 23, wherein the following conditions (17) and (18) are satisfied:

$$1 < AC_I/AC_{II}$$

$$20 < v_{Ip}/v_{In}$$

wherein

"$AC_I$" represents the sum of the absolute values of the reciprocals of the products of the focal length of each lens element and Abbe numbers thereof ($|1/(fi*vi)|$) in said first lens group;

"$AC_{II}$" represents the sum of the absolute values of the reciprocals of the products of the focal length of each lens element and Abbe numbers thereof ($|1/(fi*vi)|$) in said second lens group;

"$v_{Ip}$" represents Abbe number of said positive lens element of said first lens group; and "$v_{In}$" represents Abbe number of said negative lens element of said first lens group.

25. The viewing apparatus having a photographing function according to claim 23, wherein said positive lens element of said first lens group and said negative lens element of said first lens group are cemented to each other.

26. A viewing apparatus having a photographing function comprising:

a viewing system including a pair of viewing optical systems, each of said pair of viewing optical systems having a positive objective optical system and an eyepiece optical system, an image of an object formed through said positive objective optical system being viewed through said eyepiece optical system; and a photographing system including a photographing optical system for photographing said object image viewed through said eyepiece optical system, said photographing optical system being provided independent of said pair of viewing optical systems;

wherein said photographing optical system comprises a first lens group and a second lens group, in that order from an object, and wherein said photographing system comprises two focusing mechanisms, which operate independently from each other, for changing both absolute positions of said first lens group and said second lens group and a relative position of said first lens group and said second lens group on an optical axis of said photographing optical system.

27. The viewing apparatus having a photographing function according to claim 26, wherein said optical axis of said photographing optical system is provided between two optical axes of said pair of viewing optical systems.

28. A viewing apparatus having a photographing function comprising:

a viewing system including a pair of viewing optical systems, each of said pair of viewing optical systems having a positive objective optical system and an eyepiece optical system, an image of an object formed through said positive objective optical system being viewed through said eyepiece optical system; and a photographing system including a photographing optical system for photographing said object viewed through said eyepiece optical system, said photographing optical system being provided independently from said pair of viewing optical systems;

wherein said photographing optical system includes a first lens group and a second lens group, in that order from an object;

wherein said photographing system includes two focusing mechanisms, which operate independently from each other;

wherein one of said two focusing mechanisms moves said photographing optical system along said optical axis;

wherein the other of said two focusing mechanisms moves said first lens group along said optical axis independently; and wherein the following conditions are satisfied:

$$0.1 < f_t/f_0 < 0.7$$

$$0.2 < |T_A/T_I| < 1.5$$

wherein

"$f_t$" represents the focal length of said photographing optical system;

"$f_0$" represents the focal length of said objective optical system of said viewing optical system;

"$T_A$" represents the traveling distance of said photographing optical system necessary for achieving focus from an infinite distance to a finite object distance; and "$T_I$" represents the traveling distance of said first lens group necessary for achieving focus from an infinite distance to said finite object distance.

29. The viewing apparatus having a photographing function according to claim 28, wherein said optical axis of said photographing optical system is provided between two optical axes of said pair of viewing optical systems.

30. A viewing apparatus having a photographing function comprising:

a viewing system including a pair of viewing optical systems, each of said pair of viewing optical systems having a positive objective optical system and an eyepiece optical system, an image of an object formed through said positive objective optical system being viewed through said eyepiece optical system; and a photographing system including a photographing optical system for photographing said object viewed through said eyepiece optical system, said photographing optical system being provided independently from said pair of viewing optical systems;

wherein said photographing optical system includes a first lens group and a second lens group in that order from the object;

wherein said photographing system includes two focusing mechanisms, which operate independently from each other;

wherein one of said two focusing mechanisms moves said photographing optical system along said optical axis;

wherein the other of said two focusing mechanisms moves said second lens group along said optical axis independently; and wherein the following conditions are satisfied:

$$0.1 < f_t/f_0 < 0.7$$

$$0.2 < |T_A/T_{II}| < 1.5$$

wherein

"$f_t$" represents the focal length of said photographing optical system;

"$f_0$" represents the focal length of said objective optical system of said viewing optical system;

"$T_A$" represents the traveling distance of said photographing optical system necessary for achieving focus from an infinite distance to a finite object distance; and "$T_{II}$" represents the traveling distance of said second lens group necessary for achieving focus from an infinite distance to said finite object distance.

31. The viewing apparatus having a photographing function according to claim 30, wherein said optical axis of said photographing optical system is provided between two optical axes of said pair of viewing optical systems.

32. A viewing apparatus comprising:

a binocular optical system including a pair of viewing optical systems, each of said pair of viewing optical systems having a positive objective optical system and an eyepiece optical system, an image of an object formed through said positive objective optical system being viewed through said eyepiece optical system; and a photographing system including a photographing optical system for photographing said object viewed through said eyepiece optical system, said photographing optical system being provided independently from said pair of viewing optical systems;

wherein said photographing optical system includes a first movable lens group and a second movable lens group;

wherein said photographing system includes two focusing mechanisms, which operate independently from each other, for changing both absolute positions of said first lens group and said second lens group and a relative position of said first lens group and said second lens group on an optical axis of said photographing optical system;

wherein one of said two focusing mechanisms is interconnected with, and operates in association with, a manual focusing mechanism of said binocular optical system; and wherein the other of said two focusing mechanisms includes an autofocus system.

* * * * *